UNITED STATES PATENT OFFICE.

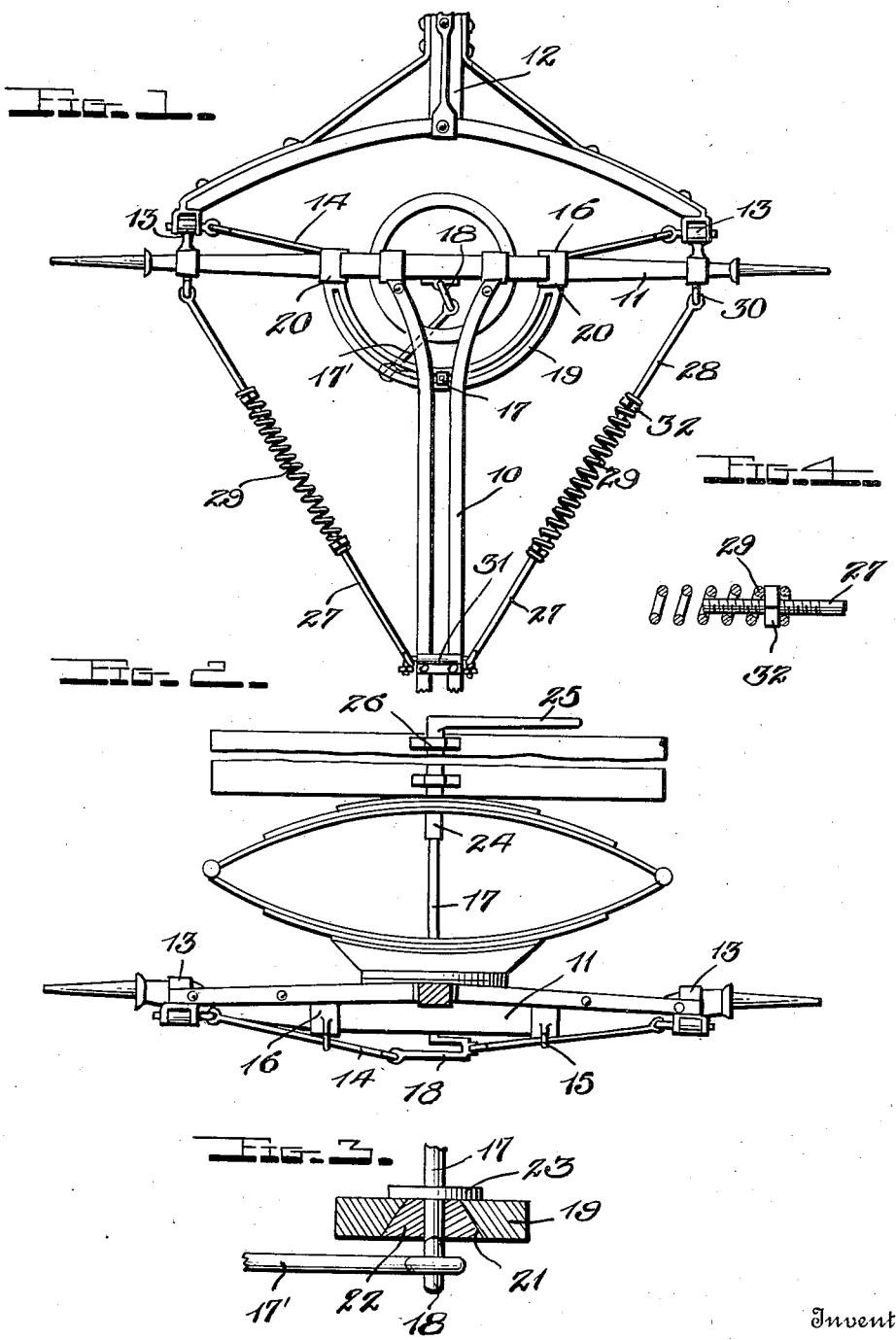

PAUL B. STEVENS, OF GRANVILLE, NORTH DAKOTA.

SHAFT AND TONGUE RELEASING ATTACHMENT FOR VEHICLES.

1,051,973.  Specification of Letters Patent.  Patented Feb. 4, 1913.

Application filed May 23, 1912. Serial No. 699,270.

*To all whom it may concern:*

Be it known that I, PAUL B. STEVENS, a citizen of the United States, residing at Granville, in the county of McHenry and State of North Dakota, have invented certain new and useful Improvements in Shaft and Tongue Releasing Attachments for Vehicles, of which the following is a specification, reference being had to the accompanying drawings.

This invention relates to a new and useful improvement in a pole releasing attachment for vehicles which is adapted to be so constructed that the driver may release the team from the vehicle should the draft animals become beyond control.

The primary object of the present invention is to provide a device of this character by which the driver may operate the same and which when released will guide the vehicle in a straight course to prevent it from overturning after the team has been released.

A further object of the present invention is to provide a releasing mechanism upon the forward axle of a vehicle which may be operated from the driver's seat and which will permit the forward axle to turn in guiding the vehicle without interfering with the operation of the device.

Other objects will appear hereinafter as the description continues.

With the above and other objects in view, this invention consists of novel details of construction, combination, formation and arrangement of parts as will be hereinafter more fully described, claimed and particularly pointed out in the appended drawings in which, Figure 1 is a plan view of the forward portion of the running gear of a vehicle having my invention as applied thereto; Fig. 2 is a front elevation of a portion of the vehicle illustrating my invention as applied thereto; Fig. 3 is a detail sectional view through the guide track; and Fig. 4 is a detail elevation of the releasing rod.

Reference now being had to the accompanying drawings wherein corresponding parts are indicated by like numerals throughout the several views, the numeral 10 indicates the ordinary running gear of a vehicle having secured thereto in the usual manner the forward turning axle 11. The tongue 12 to which the usual draft animals are applied is connected to the forward axle by means of thill couplings 13. Each of these thill couplings comprises a clip secured to the axle having a bearing formed thereon which is adapted to register with eyelets formed on the clip secured to the inner ends of the pole. A pair of laterally sliding rods 14 are slidably mounted within bearings 15 which are secured to the forward axle by means of the clips 16. The outer extremities of each of these rods are adapted to enter the thill couplings for securely holding the tongue attachment to the running gear of the vehicle.

To provide means for releasing the rods 14 so that the tongue may be readily released from the running gear of the vehicle, a crank shaft 18 is journaled in a bearing upon the inner face of the front axle; the inner ends of these rods are flexibly connected to this crank shaft as shown. This crank shaft is connected to a vertically extending shaft 17 by means of a link 17' so that when the crank is rotated it will draw the rods 14 inwardly and thereby release the same from the thill couplings. This rod 17 is supported upon the semi-circular guide track 19 which is secured at its extremities by means of clips 20 to the axle and extending rearwardly therefrom in a horizontal plane. This guide track is provided with a tapered slot 21 in which is slidably mounted a block 22 of similar construction. This block 22 is provided with a circular aperture in which the lower extremity of the rod 17 is adapted to rotate and the offset portion of the rod holds this block within the guide track while a shoulder 23 mounted upon this rod rests upon the upper face of the track. It is obvious from this construction that this guide track will support the turning rod 17 and at the same time permit the forward axle to rotate in guiding the vehicle without releasing the pole attachment from the running gear.

Secured upon the inner face of the dash board of the body of the vehicle is a releasing crank 24 having a handle 25 by which the driver may operate the same and which is supported in suitable bearings 26 mounted upon the dash board. This releasing crank 24 is provided with a squared recess in its lower portion which is adapted to be inserted over the squared upper portion of the rod 17 thereby providing a slidable connection between the two rods which will permit the vehicle body to give during the spring movement without interfering with the releasing mechanism.

To provide means for holding the axle in a position which will guide the vehicle in a straight course when the tongue attachment has been released from the running gear I provide guide members which connect the axle with the reach bar of the running gear. These guide members each comprise a pair of rods 27 and 28 respectively which are adjustably connected at their inner ends by means of a coil spring 29. The rods 28 are connected adjacent the outer ends to the axle by means of clips 30 whereas the opposite rods 27 are connected to the reach bar of the running gear by means of a clip 31. It will be seen from this construction that when the draft attachment has been released from the running gear, the coil springs 29 will hold the axle in its normal position thereby permitting the vehicle to take a straight course. The inner ends of each of the rods 27 and 28 are threaded and have mounted thereon caps 32. The threaded ends of these rods are inserted into the coil springs 29 and the caps 32 obviously provide means for securing the springs to the rods, and it is apparent that by adjusting these caps the tension of the coil springs can be increased or diminished, as desired.

It is obvious from the foregoing taken in connection with the accompanying drawings that when the draft animals become beyond control of the driver he may turn the handle 25 thereby drawing inwardly on the rods 14 which will release the thill couplings thereby releasing the draft animals from the vehicle and as the same are released the springs mounted on the guide rods will normally retain the axle so that the vehicle will travel in a forward direction. By mounting the rod within the guide track it will be further apparent that the forward axle may rotate in guiding the vehicle without interfering with the releasing mechanism and thereby providing a suitable support therefor.

While I have illustrated a specific embodiment of the present invention it is of course to be understood that other minor details of construction and changes as to form and operation may be resorted to that come within the scope of the appended claims without departing from the spirit thereof.

What I claim is:—

1. In a device of the class described, the combination of a vehicle, of a turning axle mounted thereon, a guide track supported by said axle, a block slidably mounted on said track, a rod slidably mounted within said block, means connecting the lower end of said rod with the thill couplings and means for rotating said rod substantially as described.

2. In a device of the class described, the combination of a vehicle frame, of a turning axle mounted thereon, of a semi-circular guide track secured to said axle, extending rearwardly therefrom in a horizontal plane, a tapered block slidably mounted within said track, a rod slidably mounted within said block, means mounted on said rod supporting said block within said track, means connecting the lower end of said rod for releasing the tongue attachment from the vehicle frame, and a vehicle body slidably mounted upon the upper end of said rod substantially as described.

3. In a device of the character described, the combination of a vehicle, of a turning axle mounted thereon, a semicircular guide track secured at its extremities to the said axle and extending rearwardly therefrom in a horizontal plane, said track having a tapered slot formed therein, a block slidably mounted within said slot, a vertically extending rod rotatably mounted at one end within said block, means for connecting the pole attachment with the axle, a crank shaft journaled upon the inner face of the axle, means for connecting said crank shaft with the pole attaching means, a link connecting said crank shaft with the lower extremity of said vertically extending rod, and means connected to the opposite extremity of said rod for operating the same substantially as described.

In testimony whereof I hereunto affix my signature in the presence of two witnesses.

PAUL B. STEVENS.

Witnesses:
HIRAM F. HILLS,
CHARLES KERR.